United States Patent [19]

Davidson

[11] Patent Number: 4,966,503

[45] Date of Patent: Oct. 30, 1990

[54] DRILL BIT FOR DRILLING A HOLE IN LAYERED MATERIAL OF DIFFERENT HARDNESS

[75] Inventor: Jerry W. Davidson, Valley Center, Kans.

[73] Assignee: The Boeing Company, Seattle, Wash.

[21] Appl. No.: 358,128

[22] Filed: May 30, 1989

[51] Int. Cl.⁵ ............................................. B23B 51/06
[52] U.S. Cl. ........................................ 408/59; 408/83; 408/207; 408/229
[58] Field of Search ............. 408/57, 59, 83, 207–209, 408/229

[56] References Cited

U.S. PATENT DOCUMENTS

| | | |
|---|---|---|
| 111,167 | 1/1871 | Bauman et al. |
| 800,894 | 10/1905 | Baldwin |
| 2,780,947 | 2/1957 | Willingham |
| 3,304,815 | 2/1967 | Faber |
| 3,701,606 | 10/1972 | Bogsten ................................. 408/59 |
| 4,268,197 | 5/1981 | Burgsmuller |
| 4,605,347 | 8/1986 | Jodock et al. ........................ 408/224 |

FOREIGN PATENT DOCUMENTS 677826  8/1976  U.S.S.R. ................................. 408/57

*Primary Examiner*—Steven C. Bishop
*Attorney, Agent, or Firm*—Finnegan, Henderson, Farabow, Garrett & Dunner

[57] ABSTRACT

A drill bit for drilling a hole in layered material where the first layer encountered by the bit is softer than the second layer and where the second layer encountered by the bit produces chips capable of abrading the first layer. The drill bit comprises a solid shaft having a cutting tip, an internal bore for conducting flushing fluid to the tip and a flute for conveying the fluid and the chips away from the tip. A collar fixed to the outer surface of the shaft prevents the chips from contacting the bore drilled in the first layer.

7 Claims, 2 Drawing Sheets

4,966,503

DRILL BIT FOR DRILLING A HOLE IN LAYERED MATERIAL OF DIFFERENT HARDNESS

The U.S. Government has a paid-up license in this invention and the right in limited circumstances to require the patent owner to license others on reasonable terms as provided for by the terms of Contract No. N00019-85-C-0311 awarded by the Department of Navy.

BACKGROUND OF THE INVENTION

1. Field of the Invention

The present invention relates to a drill bit for drilling a hole in layered materials wherein the first layer encountered by the bit is softer than the second layer and wherein the second layer encountered by the bit produces chips capable of abrading the first layer.

2. Description of the Related Art

Using a drill bit of the prior art to drill a hole in layered material including a layer of relatively soft composite material and a layer of relatively hard metallic material has been unsatisfactory. The relatively hard metallic material produces chips which abrade the relatively soft composite material as they exit the hole. This abrasion causes the hole in the composite material to become bell-mouthed.

In an effort to overcome this problem, current manufacturing practice is to drill through the layers of composite and metallic materials using one or a series of undersized drill bits. The hole drilled is then brought to size by a final reaming operation. It is also known in the art to drill a hole with a full-size drill bit while using extremely high air and/or coolant pressure to rapidly remove the metallic chips before erosion takes place.

It is an object of the present invention to provide a drill bit for drilling layered material which utilizes a standard size drill bit and coolant pressures normally found in machine tools, i.e., in the range of 30 to 40 psi.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, there is provided a drill bit for drilling a hole in layered material wherein the first layer encountered by the bit is softer than the second layer and wherein the second layer encountered by the bit produces chips capable of abrading the first layer. The drill bit comprises a solid shaft having a cutting tip at one axial end thereof, the shaft having an axially-extending internal bore for conducting flushing fluid to the tip and an axially-extending flute in the outer surface of the shaft for conveying the fluid and the chips away from the tip, and means fixed to the outer surface of the shaft proximate the tip for enclosing a predetermined axial length of the flute to prevent contact between the first layer and the chips.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DESCRIPTION OF THE PREFERRED EMBODIMENT

Figure 1:
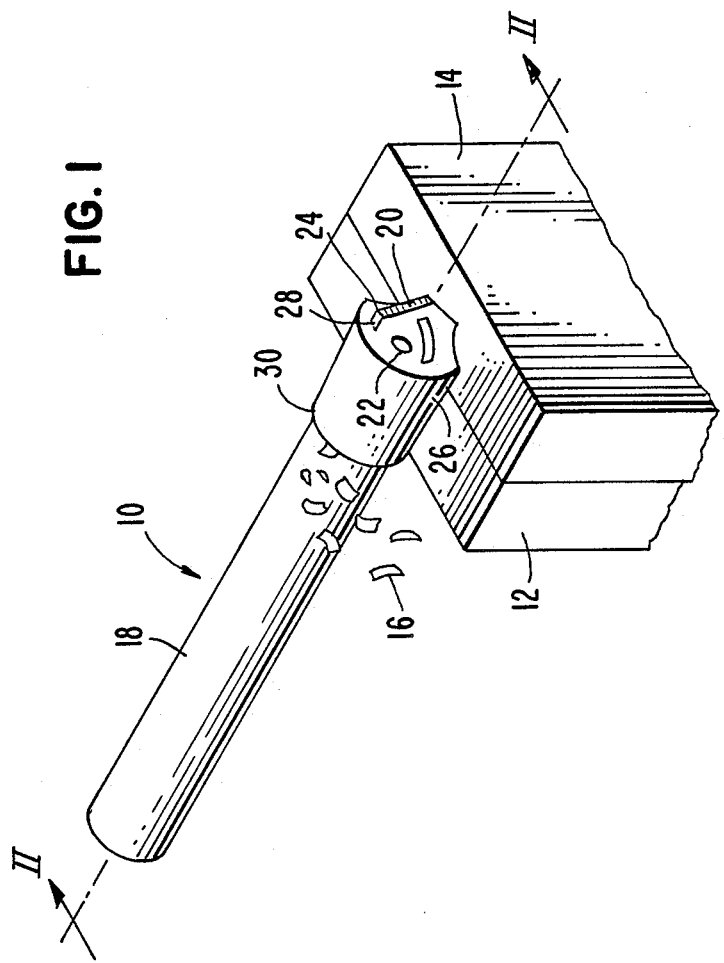
FIG. 1 is a perspective view of the drill bit of the invention in operation with the layered material cut away.

Reference will now be made in detail to the present preferred embodiment of the invention as illustrated in the accompanying drawings.

In accordance with the present invention there is provided a drill bit for drilling a hole in layered material wherein the first layer encountered is softer than the second layer. The drill bit according to the present invention is shown generally at 10 in FIG. 1. Drill bit 10 is for drilling a hole in layered material, including first layer 12 of softer material, such as a plastic composite, and second layer 14 of a relatively hard material such as aluminum, steel or the like. In forming the hole, drill bit 10 first encounters layer 12 and then encounters layer 14. Since layer 12 is made of a softer material than layer 14, chips 16 produced in drilling the latter are capable of abrading first layer 12. While the invention is particularly direct to drilling layers of plastic composite and metal, it may be applied to drilling any layered material where chips of the second layer will abrade the bore of the first layer during drilling.

The drill bit of the invention comprises a solid shaft having a cutting tip at one axial end thereof, the shaft having an axially-extending internal bore for conducting flushing fluid to the tip and an axially-extending flute in the outer surface of the shaft for conveying the fluid and the chips away from the tip. As embodied herein and as shown principally in FIGS. 1 and 2, the present invention includes solid shaft 18 having cutting tip 20 at one axial end thereof for cutting into layers 12, 14. Preferably, cutting tip 20 is fixed in abutting, coaxial relation to one axial end of the shaft, and the diameter of shaft 18 is less than the diameter of cutting tip 20.

In order to provide for removal of the chips, a flushing fluid is directed to cutting tip 20 and flushes away chips 16. For this purpose, shaft 18 includes axially extending internal bore 22, which conducts flushing fluid to tip 20. Shaft 18 further includes an axially extending flute 24 formed in the outer surface thereof. Preferably shaft 18 includes two radially opposed internal bores 22 and two radially opposed flutes 24. Flutes 24 convey the flushing fluid and chips 16 produced by the drill bit rearwardly along shaft 18 away from tip 20. The surfaces of flutes 24 preferably are polished in order to minimize friction with chips 16 passing therethrough.

In accordance with the present invention, the drill bit further comprises means fixed to the outer surface of the shaft proximate the tip for enclosing a predetermined axial length of the flute to prevent contact between the first layer and the chips. As embodied and broadly described herein, the enclosing means includes tubular collar 26. Collar 26 is fixed to the outer surface of shaft 18 proximate cutting edge 20. Collar 26 encloses a predetermined axial length of flutes 24 so that as chips 16 produced by second layer 14 are flushed rearwardly, collar 26 prevents them from contacting the bore drilled in first layer 12.

The predetermined axial length is at least equal to the axial depth of the hole drilled so that collar 26 prevents contact between softer first layer 12 and chips 16 along the entire axial depth of the hole drilled. The predetermined axial length is less than the axial length of flutes 24 s that the flushing fluid and chips 16 are expelled rearwardly of collar 26.

Figure 2:
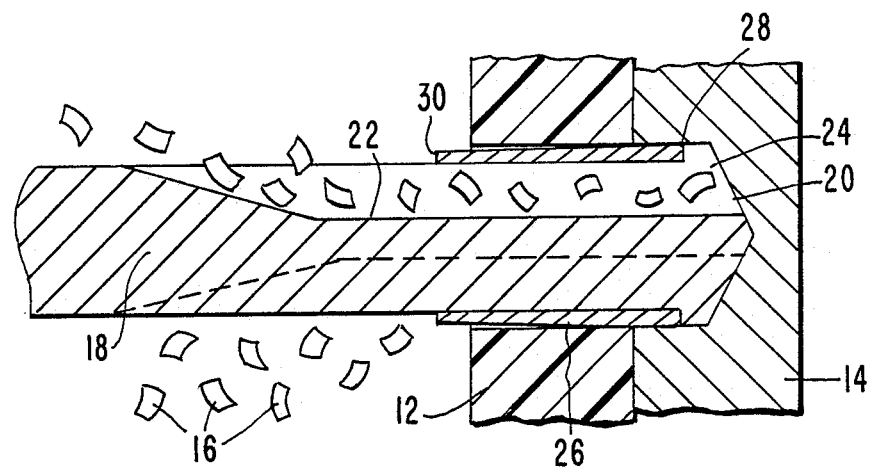
FIG. 2 is a cross-sectional view of the drill bit of FIG. 2 and taken along line II—II.
Figure 3:
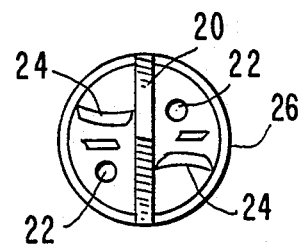
FIG. 3 is a front view of the cutting tip of the drill bit of the present invention.

As embodied herein and shown principally in FIGS. 1 and 2, collar 26 includes first end 28 proximate cutting tip 20 and opposed second end 30 spaced from first end 28 the predetermined axial length. Cutting tip 20 axially projects from first end 28 of collar 26 and has a diameter generally equal to the outer diameter of collar 26 at first end 28 thereof. By this arrangement collar 26 fits snugly against cutting tip 20 and there is no leakage of flushing fluid therebetween. Furthermore, the outer diameter of collar 26 preferably tapers inwardly from first end 28 in a manner to prevent galling as collar 26 passes through layers 12, 14.

The drill bit according to the present invention is operated as follows. Shaft 18 is rotated to drill cutting tip 20 through the layered material. Shaft 18 is rotated at a first speed when cutting tip 20 encounters first layer 12. The rate of speed of the rotation of shaft 18 is then decreased when cutting tip 20 encounters second layer 14. Since the material of second layer 14 is harder than the material of first layer 12, chips 16 produced as cutting tip 20 drills through second layer 14 are capable of abrading first layer 12. Internal bore 22 in shaft 18 conducts flushing fluid to cutting tip 20. Flute 24 conveys the flushing fluid and chips 16 away from cutting tip 20. Since the predetermined axial length of flute 24 enclosed by collar 26 is less than the axial length of flute 24, chips 16 and the flushing fluid are conveyed along flute 24 to a location rearwardly of collar 26. Moreover, since the predetermined axial length is at least equal to the axial depth of the hole drilled, chips 16 produced by second layer 14 are prevented from contacting and abrading first layer 12. Drill bit 10 of the present invention thereby produces a hole of uniform diameter.

Additional advantages and modifications will readily occur to those skilled in the art. The invention in its broader aspects is, therefore, not limited to the specific details, representative apparatus and illustrative example shown and described. Accordingly, departures may be made from such details without departing from the spirit or scope of the general inventive concept as defined by the appended claims and their equivalents.

What is claimed is:

1. A drill bit for drilling a hole in layered material wherein the first layer encountered by said bit is softer material than the second layer and wherein the second layer when encountered by said bit produced chips capable of abrading the first layer, said bit comprising:
   a solid shaft having a cutting tip at one axial end thereof, said shaft having an axially-extending internal bore for conducting flushing fluid to said tip and an axially-extending flute in the outer surface of said shaft for conveying said fluid and said chips away from said tip; and
   a tubular collar fixed to the outer surface of said shaft, said collar having a first end proximate said tip and an opposed second end spaced from said first end a predetermined axial length, said cutting tip axially projecting from said first end of said collar and having a diameter generally equal to the diameter of said collar at said first end thereof.

2. The drill bit of claim 1 wherein the outer diameter of said collar tapers inwardly from said first end, said taper being sufficient to prevent galling as the collar passes through said layers.

3. The drill bit of claim 1 wherein said shaft has two radially opposed internal bores and two radially opposed flutes.

4. The drill bit of claim 3 wherein said predetermined axial length is less than the axial length of said flutes.

5. The drill bit of claim 1 wherein the surface of said flute is polished to minimize friction with said chips passing therethrough.

6. The drill bit of claim 1 wherein said predetermined axial length is at least equal to the axial depth of the hole drilled.

7. A drill bit for drilling a hole in layered material wherein the first layer encountered by said bit is softer than the second layer and wherein the second layer encountered by said bit produces chips capable of abrading the first layer, said bit comprising:
   a solid shaft having a cutting tip at one axial end thereof, said cutting tip having a first diameter and said shaft having a second diameter less than said first diameter and radially tapering inwardly axially away from said tip, said shaft having a pair of radially-opposed, axially-extending internal bores for conducting flushing fluid to said tip and a pair of radially-opposed, axially-extending flutes in the outer surface of said shaft for conveying said fluid and said chips away from said tip; and
   a tubular collar fixed to the outer surface of said shaft for enclosing said flutes to prevent contact between said first layer and said chips, said collar having a predetermined axial length extending from a first end proximate said tip to a second end axially remote from said tip, said one axial end of said shaft having an outer diameter not greater than said first diameter and axially abutting said cutting tip, the outer diameter of said collar radially tapering inwardly axially from said one axial end in a manner corresponding to said second diameter.

* * * * *